(12) United States Patent
Cristianini

(10) Patent No.: US 6,944,602 B2
(45) Date of Patent: Sep. 13, 2005

(54) SPECTRAL KERNELS FOR LEARNING MACHINES

(75) Inventor: Nello Cristianini, Berkeley, CA (US)

(73) Assignee: Health Discovery Corporation, Savannah, GA (US)

( * ) Notice: Subject to any disclaimer, the term of this patent is extended or adjusted under 35 U.S.C. 154(b) by 355 days.

(21) Appl. No.: 10/087,145

(22) Filed: Mar. 1, 2002

(65) Prior Publication Data

US 2003/0041041 A1 Feb. 27, 2003

Related U.S. Application Data

(60) Provisional application No. 60/272,391, filed on Mar. 1, 2001.

(51) Int. Cl.[7] .............................................. G06F 15/18
(52) U.S. Cl. .............................. 706/12; 706/14; 706/46
(58) Field of Search .............................. 706/12, 14, 46

(56) References Cited

PUBLICATIONS

Nello Cristianini et al, Support Vector Machines, Mar. 2000, Cambridge University Press, First Published, all but particularily 11, 30, 33, 36, 94, 151, 156–159, 169.*
F. R. K. Chung et al, A near optimum algorithm for edge separators (Preliminary Version), 1994, ACM, 0–89791–663–8/94/0005.*

Fan R. K. Chung, Specral Graph Theory, 1997, AMS, ISBN 0–821–80315–8.*
Francois Fouss et al, Some novel ways of computing dissimilarities between nodes of a graph, with application to collaborative filtering, comtemporary, Unite ISYS/IAG.*

* cited by examiner

Primary Examiner—Joseph P. Hirl
(74) Attorney, Agent, or Firm—Procopio, Cory Hargreaves & Savitch

(57) ABSTRACT

The spectral kernel machine combines kernel functions and spectral graph theory for solving problems of machine learning. The data points in the dataset are placed in the form of a matrix known as a kernel matrix, or Gram matrix, containing all pairwise kernels between the data points. The dataset is regarded as nodes of a fully connected graph. A weight equal to the kernel between the two nodes is assigned to each edge of the graph. The adjacency matrix of the graph is equivalent to the kernel matrix, also known as the Gram matrix. The eigenvectors and their corresponding eigenvalues provide information about the properties of the graph, and thus, the dataset. The second eigenvector can be thresholded to approximate the class assignment of graph nodes. Eigenvectors of the kernel matrix may be used to assign unlabeled data to clusters, merge information from labeled and unlabeled data by transduction, provide model selection information for other kernels, detect novelties or anomalies and/or clean data, and perform supervised learning tasks such as classification.

17 Claims, 4 Drawing Sheets

SPECTRAL KERNELS FOR LEARNING MACHINES

RELATED APPLICATIONS

This application claims the benefit of priority of U.S. provisional application Ser. No. 60/272,391, filed Mar. 1, 2001, which is incorporated herein by reference.

FIELD OF THE INVENTION

The present invention relates generally to learning machines and more particularly to kernel-based machines for data analysis.

BACKGROUND OF THE INVENTION

In recent years, machine-learning approaches for data analysis have been widely explored for recognizing patterns which, in turn, allow extraction of significant features within a large amount of data that often contains irrelevant detail. Learning machines comprise algorithms that may be trained to generalize. Trained learning machine algorithms may then be applied to predict the outcome in cases of unknown outcome. Machine-learning approaches, which include neural networks, hidden Markov models, belief networks, support vector and other kernel-based machines, are ideally suited for domains characterized by the existence of large amounts of data, noisy patterns and the absence of general theories.

To date, the majority of learning machines that have been applied to data analysis are neural networks trained using back-propagation, a gradient-based method in which errors in classification of training data are propagated backwards through the network to adjust the bias weights of the network elements until the mean squared error is minimized. A significant drawback of back-propagation neural networks is that the empirical risk function may have many local minima, a case that can easily obscure the optimal solution from discovery. Standard optimization procedures employed by back-propagation neural networks may converge to a minimum, but the neural network method cannot guarantee that even a localized minimum is attained, much less the desired global minimum. The quality of the solution obtained from a neural network depends on many factors. In particular, the skill of the practitioner implementing the neural network determines the ultimate benefit, but even factors as seemingly benign as the random selection of initial weights can lead to poor results. Furthermore, the convergence of the gradient-based method used in neural network learning is inherently slow. A further drawback is that the sigmoid function has a scaling factor, which affects the quality of approximation. Possibly the largest limiting factor of neural networks as related to knowledge discovery is the "curse of dimensionality" associated with the disproportionate growth in required computational time and power for each additional feature or dimension in the training data.

Kernel methods, based on statistical learning theory, are used for their conceptual simplicity as well as their remarkable performance. Support vector machines, kernel PCA (principal component analysis), kernel Gram-Schmidt, kernel Fischer discriminant, Bayes point machines, and Gaussian processes are just a few of the algorithms that make use of kernels for problems of classification, regression, density estimation and clustering. Kernel machines can operate in extremely rich feature spaces with low computational cost, in some cases accessing spaces that would be inaccessible to standard systems, e.g., gradient-based neural networks, due to their high dimensionality.

Kernel methods operate by mapping data into a high dimensional feature space then applying one of many available general-purpose algorithms suitable for work in conjunction with kernels. Put simply, the kernel virtually maps data into a feature space so that the relative positions of the data in feature space can be used as the means for evaluating, e.g., classifying, the data. The degree of clustering achieved in the feature space, and the relation between the clusters and the labeling to be learned, should be captured by the kernel.

Kernel methods exploit information about pairwise similarity between data points. "Similarity" is defined as the inner product between two points in a suitable feature space, information that can be obtained with little computational cost. The mapping into feature space is achieved in an implicit way: the algorithms are rewritten to need only inner product information between input points. The inner product is then replaced with a generalized inner product, or "kernel function". This function returns the value of an inner product between feature vectors representing images of the inputs in some feature space.

While the learning module is general purpose, the kernel is problem specific. It is the kernel that makes it possible to effectively work in very rich feature spaces, provided the inner products can be computed. By developing algorithms that use only the inner products, it is possible to avoid the need to compute the feature vector for a given input. One of the key advantages to this approach is its modularity: the decoupling of algorithm design and statistical analysis from the problem of creating appropriate function/feature spaces for a particular application.

Defining the appropriate kernel function allows one to use a range of different algorithms to analyze the data while, at the same time, avoiding many practical prediction problems. It is crucial for the performance of a system that the kernel function fits the learning target in some way, i.e., that in the feature space, the data distribution is somehow correlated to the label distribution. Measuring the similarity between two kernels, or the degree of agreement between a kernel and a given target function is, therefore, an important problem.

For a given application, selection of a kernel corresponds to implicitly choosing a feature space since the kernel function is defined by $$k(x,z) = <\phi(x), \phi(z)> \quad (1)$$

for the feature map $\phi$. Given a training set $S=\{x_1, x_2, \ldots x_m\}$, the information available to kernel-based algorithms is contained entirely in the matrix of inner products $$G = K = (k(x_i, x_j))_{i,j=1}^m, \quad (2)$$

known as the Gram matrix G or the kernel matrix K. This matrix encodes the similarity level between all pairs of data items induced by the kernel.

Kernels can be used without actually having the feature space $\mathcal{F}$ implicitly defined, as long as one can guarantee that such extra space exists, i.e., that the kernel can actually be regarded as an inner product of some space.

It is possible to characterize the kernel in many ways. One of the simplest is that a function k(x,z) is a valid kernel if and only if it always produces symmetric and positive definite Gram matrices for any finite set of data. Given an explicit feature map $\phi$, Equation 1, above, can be used to compute the corresponding kernel. Often, however, methods are sought to directly provide the value of the kernel without explicitly computing $\phi$. This enables one to use extremely rich features spaces, even infinite dimensional, at least from a computational perspective.

Starting with kernels K(x,z)=<x,z>, one can define more complex kernels, the best known of which is the polynomial kernel. Given a kernel k, the polynomial construction creates a kernel $\hat{k}$ by applying a polynomial with positive coefficients to k. For example, $$\hat{k}(x,z)=(k(x,z)+D)^p, \quad (3)$$

for fixed values of D and integer p. If the features space of k is $\mathcal{F}$, then the feature space of $\hat{k}$ is indexed by t-tuples of features from $\mathcal{F}$, for t=0, 1, ..., p. Hence, for a relatively small computational cost, the algorithms can be applied in a feature space of vastly expanded expressive power. Further, the example of the Gaussian kernel $\bar{k}$ can be considered:

$$\bar{k}(x, z) = \exp \frac{k(x, x) + k(z, z) - 2k(x, z)}{\sigma^2}, \quad (4)$$

with a feature space of infinitely many dimensions. Other kernels include sigmoid, $B_n$-spline of odd order, and radial basis function (RBF) kernels, among others.

An important object in machine learning is minimization of expected risk in translating concepts from statistical learning theory into practical algorithms. Whether or not one has knowledge of the test patterns during training makes a significant difference in the design of learning algorithms. The difference is between minimizing test error in a specific test set versus minimizing expected error over all possible test sets. The problem of overall risk minimization is known as "transduction," where the goal is to directly estimate the values of the unknown function for points of interest from the given data. This can be compared with the classical scheme of first using an inductive step to approximate the function then, using deduction, deriving the values of the given function for the points of interest. In the inductive/deductive method, the structural or specific test risk is minimized. With overall risk minimization provided by transduction, better generalization can be obtained. Unfortunately, transduction is very difficult to address, both computationally and conceptually.

Methods such as spectral graph theory (SGT) were introduced in the 1970's, with one of their main goals being to deduce the principal properties and structure of a graph comprising a plurality of nodes from its graph spectrum, where the graph spectrum is made up of the eigenvalues of the graph. It has recently been proposed that a graph theoretic, i.e., non-kernel based, approach to learning machines might be used to retrieve useful information from a dataset. In SGT, eigenvectors of a matrix are used to bisect, or partition, nodes in a graph corresponding to the matrix. To provide an example, from graph spectra, one can obtain information about the number of strongly connected components within the graph, the limiting distribution of a random walk on the graph and the time to reach it, etc. Applications of SGT are known and have been reported in many different disciplines, including chemistry, theoretical physics, quantum physics and communication networks.

Both kernel methods and graph theory provide certain advantages in the area of information extraction and learning from data, however, because of the very different approaches used by the two methods, they have heretofore not been combined. It is an object of the present invention to exploit the advantages of both kernel methods and spectral graph theory to solve problems of machine learning, including the problem of transduction.

BRIEF SUMMARY OF THE INVENTION

The present invention provides means for solving problems of machine learning based on the use of a combination of kernel functions and spectral graph theory. The kernel function outputs the inner product between the images of two data items in a feature space. The inner product can often be computed at low computational cost, however, the features being used are implicitly very complex. The data is stored in a matrix known as a kernel matrix or Gram matrix containing all pairwise kernels between the data. Other types of matrices may be used as well, including Laplacian matrices. Eigenvectors of the kernel matrix may be used to assign unlabeled data to clusters, merge information from labeled and unlabeled data by transduction, provide model selection information for other kernels, detect novelties or anomalies and/or clean data, and perform supervised learning tasks such as classification.

In one exemplary application of the invention, the sign (+ or −) of the entries of the second eigenvector of the kernel matrix are used to assign the data to classes, e.g., positive or negative.

In another exemplary application, transduction is performed by taking a dataset that is at least partially labeled, selecting a kernel K, which is normalized to be $-1 \leq K \leq +1$, then filling the kernel matrix with $y_i y_j$ if the relative points are both labeled, and $K(x_i, x_j)$ otherwise. The second eigenvector of the kernel matrix is obtained to provide the maximally aligned solution consistent with the known labels. The second eigenvector is thresholded, then labels can be assigned to the unlabeled data according to the aligned solution.

In applying SGT methods to kernel methods, the dataset is regarded as nodes of a fully connected graph. A weight equal to the kernel between the two nodes is assigned to each edge of the graph. The adjacency matrix of the graph is equivalent to the Gram matrix. The eigenvectors and their corresponding eigenvalues provide information about the properties of the graph. The second eigenvector can be thresholded to approximate the class assignment of graph nodes, minimizing the cost of a cut of a clustering. The first eigenvector of the adjacency matrix provides distribution of an ergodic random walk, using such matrix as the transition matrix. The relations between first and second eigenvalues also give information about the connectivity of the graph. Looking at the random walk on the graph associated with the Gram matrix, the stationary distribution will provide information about the "popularity" of a point based on how many other points are similar to it. This allows anomalous points to be easily spotted.

The inventive spectral kernel machine is applicable to kernel-based learning machines in general and to support vector machines in particular. In an exemplary embodiment, a computer system is provided for analysis of a data using a support vector machine. The exemplary system comprises a storage device for storing a database containing a training data set and a test data set, and a processor for executing one or more support vector machines. The processor is also operable for collecting the training data set from the database, optionally pre-processing the training data set to enhance each of a plurality of training data points, training the support vector machine using the pre-processed training data set. If the learning process is supervised or semi-supervised, the results of the training process may be tested, in which case the processor also collects test data set from the database, optionally pre-processes the test data set in the same manner as was the training data set, and tests the trained support vector machine using the pre-processed test data set. The processor may optionally post-process the test output to determine if the test output is an optimal solution. The exemplary system may also comprise a communications device for receiving the test data set and the training data set from a remote source. In such a case, the processor may be operable to store the training data set in the storage device prior to pre-processing of the training data set and, if test data is used, to store the test data set in the storage device prior to pre-processing of the test data set. The exemplary system may also comprise a display device for displaying the post-processed test data. The processor of the exemplary system may further be operable for performing each additional function described above. An exemplary computer system for implementing a support vector machine is described in U.S. Pat. Nos. 6,157,921 and 6,128,608 which are incorporated herein by reference in their entirety.

BRIEF DESCRIPTION OF THE DRAWINGS

Exemplary embodiments of the present invention will hereinafter be described with reference to the below-listed drawings, in which like numerals indicate like elements throughout the figures.

DETAILED DESCRIPTION OF THE PREFERRED EMBODIMENTS

Figure 1A:
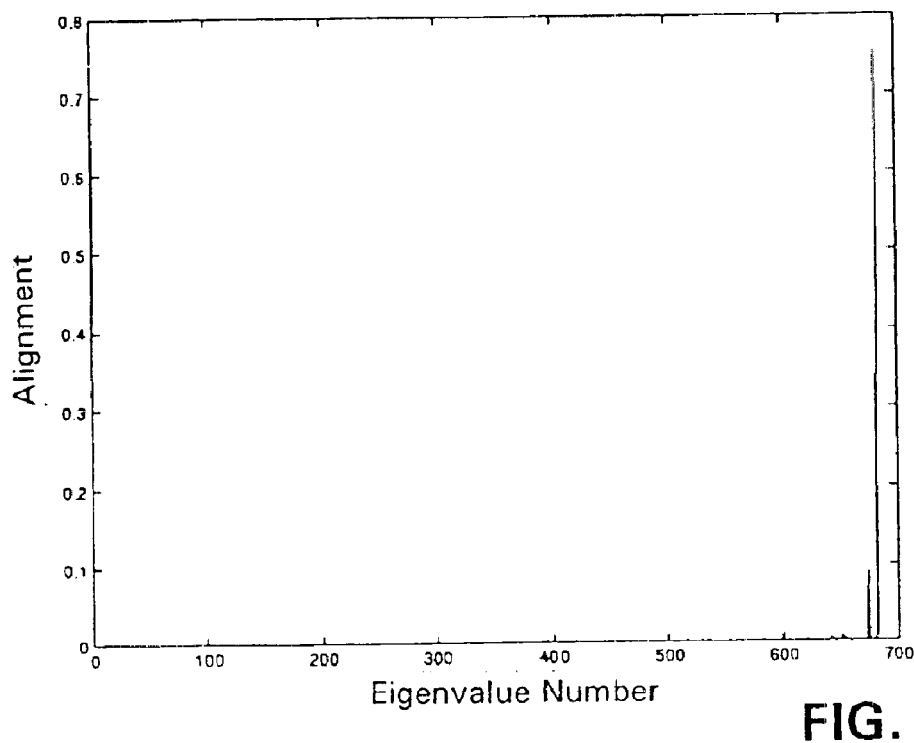
FIG. 1(a) is a plot of the alignment of different eigenvectors with the labels in the UW breast cancer dataset with a linear kernel, in order of increasing eigenvalue.

The following detailed description utilizes a number of acronyms which are generally well known in the art. While definitions are typically provided with the first instance of each acronym, for convenience, Table 1 below provides a list of the acronyms and abbreviations used herein along with their respective definitions.

TABLE 1

| ACRONYM | DESCRIPTION |
| --- | --- |
| ATAPI | attachment packet interface |
| DMA | direct memory access |
| EIDE | enhanced IDE |
| I/O | input/output |

TABLE 1-continued

| ACRONYM | DESCRIPTION |
| --- | --- |
| IDE | integrated drive electronics |
| LAN | local area network |
| RAM | random access memory |
| ROM | read-only memory |
| SCSI | small computer system interface |
| SGT | spectral graph theory |
| SVM | support vector machine |
| UCI | University of California, Irvine |
| UW | University of Wisconsin |
| WAN | wide area network |

The present invention provides improved methods for training of kernel-based learning machines for use in analyzing data using learning machines. Specifically, the present invention combines results from spectral graph theory (SGT) with the kernel function to obtain a new class of learning algorithm. The algorithms disclosed herein provide means for supervised learning, unsupervised learning (clustering) and semi-supervised learning (transduction), model selection, and novelty detection in learning machines, including support vector machines.

All of the information needed by the learning machine is contained within the "kernel matrix", or Gram matrix, which can be regarded as a pairwise similarity matrix between all pairs of points in the dataset. The resulting matrix is symmetric and positive semi-definite (its eigenvalues are always non-negative real numbers) and consequently can be written as $$K = \sum_{i} \lambda_i v_i v_i',$$

where $v_i$ and $\lambda_i \geq 0$ are the eigenvectors and eigenvalues of K, and $v_i'$ is the transpose of $v_i$, so that $v_i v_i'$ is the outer product of $v_i$ and its transpose. The properties of the kernel matrix reflect the relative positions of the points in the feature space. For example, a kernel matrix K=I, where I is the identity, would correspond to having all points orthogonal to each other in feature space and, hence, there would be no useful notion of similarity since every point is similar to every other point in the same way.

All of the information needed to specify a clustering of a set of data is contained in the matrix $K_{ij}$=(cluster $(x_i)$== cluster $(x_j)$), where (a==b)∈{-1+, 1}. After a clustering is specified, the cost of that clustering can be measured. The general problem to be solved using graph theory is to assign class-labels to data points so as to maximize the cost function, i.e., minimize the "cut cost" C(S,K,y) of partitioning:

$$C(S, K, y) = \frac{\sum_{i,j: y_i \neq y_j} k(x_i, x_j)}{m \|K\|_F}, \quad (5)$$

where K is the kernel matrix, S is the sample, and F is an index referring to the Frobenius norm that corresponds to the inner product between matrices $\langle K_1, K_2 \rangle_F$.

If the kernel matrix is considered as an adjacency matrix, the cost of partitioning a graph is given by the total weight of the edges that need to be cut or removed, and is exactly the numerator of the cut cost, i.e., $$\sum_{ij: y_i \neq y_j} k(x_i, x_j).$$

The concept underlying the present invention is the application of spectral graph theory (SGT) methods to kernel methods by regarding the dataset (for the kernel method) as the nodes, or vertices, of a fully connected graph. At least a portion of these nodes are connected together by one or more edges. Each edge of the graph is assigned a weight equal to the kernel between the two nodes that are connected by that edge. As a definition, let G=(V,E) be a graph whose vertices (nodes) are V and whose edges are E. The adjacency matrix of the graph is made up of rows and columns labeled by the nodes, with a 1 or 0 in position $(V_i, V_j)$ according to whether $V_i$ and $V_j$ are adjacent or not. Thus, the $|V| \times |V|$ adjacency matrix $A(i,j)$ contains a 0 (zero) if there is no edge $c_{ij}$ connecting $V_i$ to $V_j$, and contains a weight $w_{ij}$ otherwise. (Note that for unweighted graphs, the weight is always 1.) This adjacency matrix is equivalent to the kernel matrix, also known as the Gram matrix. Thus, the kernel method and graph theory are combined.

The Laplacian matrix L of a graph G is defined as L=D−A, where A is the adjacency matrix, D=diag($d_1, d_2, \ldots, d_m$) and $d_i = \Sigma_j w_{ij}$. (Note that since the adjacency matrix A and the kernel matrix K are equivalent, A and K may be used interchangeably in the following description.)

The eigenvectors of A and L, and their eigenvalues (also known as the "graph spectrum"), provide a significant amount of information about the graph. The second eigenvector (Fiedler's eigenvector) can be thresholded to approximate the class assignment of graph nodes, minimizing the cost of a cut. Many variations on the preceding theme can be applied including using the Laplacian matrix L instead of the adjacency matrix A.

A standard proof technique used is to relax the constraint in a (NP-hard) discrete optimization problem so as to transform it into a continuous problem, allowing it to be solved approximately. The continuous solution can be thresholded to find an approximation of the discrete problem's solution. Such techniques rest on the Courant-Fischer Minimax Theorem, where, if $A \in R^{m \times m}$ is symmetric, then for k=1, ..., m, $$\lambda_k(A) = \max_{dim(S)=k} \min_{0 \neq y \in S} \frac{y'Ay}{y'y} = \min_{dim(S)=m-k+1} \max_{0 \neq y \in S} \frac{y'Ay}{y'y} \quad (6)$$

where the first eigenvector of A is Frobenius' eigenvector and the second eigenvector of L is Fiedler's eigenvector.

The first eigenvector of the adjacency matrix A gives the stationary distribution of an ergodic random walk, using the matrix as a transition matrix. The relationship between the first and second eigenvalues also gives information about the connectivity of the graph. Looking at the random walk on the graph associated with the Gram (kernel) matrix, which, as stated previously, is equivalent to the adjacency matrix, the stationary distribution provides information about the "popularity" of a point based on how many other points are similar to it, i.e., the "typicity". This allows anomalous points to be readily spotted. The entropy of this distribution provides a measure of the amount of clusterization achieved by a kernel. The distribution can be thresholded to separate typical cases from anomalies, then, if desired, only the typical cases can be kept for training.

Looking now at spectral graph bisection, finding a balanced dichotomy of a weighted graph that minimizes the cost of the cut is an NP-hard problem, so it is necessary to settle for a heuristic solution. Preferred methods provide high quality partitionings at moderate cost and have formal properties that fit in with the kernel approach. In the preferred embodiment, eigenvectors of the Laplacian matrix are used to bisect a graph.

The problem of spectral graph bisection can be stated as a discrete optimization problem. A weighted graph needs to be split into two equal parts while minimizing the cost of the cut. This problem is NP-hard.

Consider the quantity cut-cost $$C = \sum_{y_i \neq y_j} K(i, j), \quad (7)$$

and define a quantity referred to as "alignment":

$$\hat{A} = \sum_{i,j} y_i y_j K(i, j). \quad (8)$$

Alignment is a measure of similarity between clustering of a set of points that can not only be used to assess the relationships between the embeddings generated by two different kernels, such as a selected kernel and an "ideal" kernel, but also can be used to assess the similarity between the clustering of a labeled dataset induced by a kernel and the clustering induced by the labels themselves. Alignment captures the notion of a good clustering as achieving high similarity within the clusters and low similarity between them. Formally, alignment can be regarded as a Frobenius inner product between normalized kernel matrices. Alignment has certain convenient properties: it can be calculated before any training of the kernel machine takes place, and based only on training data information; it is sharply concentrated around its expected value, and hence, its empirical value is stable with respect to different splits of the data. If the kernel is very aligned with the labels, there exists a separation of the data with a low upper bound on the generalization error. Thus, it is possible to measure and optimize alignment based on training set information while achieving a better generalization power on the test set in a transductive setting.

A dichotomy of the set is denoted by $y \in \{-1, +1\}^m$. The preceding definitions imply the following two equations:

$$\sum_{y_i = y_j} K(i, j) - \sum_{y_i \neq y_j} K(i, j) = \hat{A} \quad (9)$$

and $$\sum_{y_i = y_j} K(i, j) + \sum_{y_i \neq y_j} k(i, j) = \sum_{ij} K(i, j), \quad (10)$$

hence, $$\sum_{y_i \neq y_j} K(i, j) = C = \frac{1}{2} \sum_{ij} K(i, j) - \hat{A}, \quad (11)$$

which gives the relation $$\sum_{y_i, y_j} y_i y_j K(i, j) = \hat{A} - \sum_{y_i, y_j} K(i, j) = -2C, \quad (12)$$

showing that the quantity y'Ly=2C does, in fact, give the cut cost for the dichotomy $$y\left(y'Ly = y'Dy - y'Ky = \sum_{i,j} K(i, j) - \hat{A} = 2C\right). \quad (13)$$

It would be desirable to minimize the cut cost by finding $y \in \{-1,+1\}^m$, however this problem is NP-hard. Therefore, the solution must be approximated. One option for solution is to impose a slightly looser constraint on $$y, y \in R^m, \sum_i y_i^2 = m, \sum_i y_i = 0,$$

which represents the case of a balanced split. This yields the relationship min $y'Ly$ subject to $$y \in R^m, \sum_i y_i^2 = m, \sum_i y_i = 0. \quad (14)$$

Since zero is an eigenvalue of L with eigenvector j, the all ones vector, the problem is equivalent to finding the eigenvector of the smallest non-zero eigenvalue $$\lambda = \min_{0 \neq y \perp j} \frac{y'Ly}{y'y}.$$

Hence, the eigenvalue $\lambda$ provides a lower bound on the cut cost $$\min_{y \in \{-1,1\}^m} C(S, k, y) \geq \frac{\lambda}{2\|K\|_F}. \quad (15)$$

Thus, the eigenvector corresponding to the eigenvalue $\lambda$ of the Laplacian can be used to obtain a good approximate split, and $\lambda$ gives a lower bound on the cut-cost. One can now threshold the entries of the eigenvector in order to obtain a vector with $-1$ and $+1$ entries.

The following observations may be made: the number of connected components (clusters) is equal to the number of zero eigenvalues of the Laplacian L; the Laplacian is positive semidefinite, its rows sum to zero, its smallest eigenvalue $\lambda_1$ is 0; since L is positive semidefinite, all other eigenvalues must be greater than zero for a connected graph. The eigenvector corresponding to the next smallest eigenvalue $\lambda_2$ approximately gives the best balanced split since it enforces the condition that the weight of positives is the same as the weight of negatives by being orthogonal to the constant smallest eigenvector. If the graph is not connected, the multiplicity of eigenvalue 0 is related to the number of disconnected components. Thus, an eigenvalue near zero must belong to an eigenvector with both positive and negative components which partition the graph into nearly disconnected components. Further, $\lambda_2(L)$ is the algebraic connectivity of the graph. Similarly, $\lambda_2(K)$ is the maximum alignment of the kernel. Finally, the separation between eigenvalues gives information about the stability of the eigenvectors (or eigenspaces.)

It can be shown that the spectrum of a Gram matrix is sharply concentrated around its mean. Given the variational characterization of eigenvalues, it is apparent that they are a function of a sum of random variables, and the maximum variation of this sum by varying or removing one element is bounded. Hence, the spectrum, and the performance of the eigenvectors, are concentrated.

Informally, a random variable is concentrated when the probability of assuming values much different from its expected value is very low. The information that a random variable is concentrated can be exploited as a powerful tool in learning theory, and can be obtained with relative ease by applying known techniques such as McDiarmid's bound, Talagrand's inequalities, and other concentration theorems.

If a quantity is concentrated, there is a high probability that its empirical value is close to its true value, and observing it on a training dataset gives confidence that it will have a similar value on the test dataset.

According to McDiarmid's bound, let $X_1, \ldots, X_m$ be independent random variables taking values in a set E and assume that there exists a function $f: x^m \to R$ satisfies $$\sup_{x_1,\ldots,x_m,x_i'} |f(x_1, \ldots, x_m) - f(x_1, \ldots, x_i', x_{i+1}, \ldots, x_m)| \leq c_i, \quad (16)$$

where $1 \leq i \leq m$. Then, for all $c > 0$, $$P\{|f(X_1, \ldots, X_m) - Ef(X_1, \ldots, X_m)| > \varepsilon\} \leq 2\exp\left(\frac{-2\varepsilon^2}{\sum c_i^2}\right), \quad (17)$$

which means that a bound similar to the law of large numbers can be applied to any function $f$ which does not overly depend on individual samples $x_i$.

Alternatively, known leave-one-out estimates may be used to determine concentration following the premise that if the function does not change significantly when one variable is removed altogether, the group of variables is concentrated.

The present invention is applicable to all types of machine learning, i.e., supervised, semi-supervised, and unsupervised. For purposes of this discussion, the following assumptions apply: a dataset of m points is drawn from a set X according to a fixed distribution D. In the supervised learning case, it is also assumed that a vector $y \in \{-1,+1\}^m$ (labels) is given. In the semi-supervised case, it is assumed that a vector $y \in \{-1,*,+1\}^m$ is given, where * means that there is no label for some point or points within the dataset.

Consider a graph G whose adjacency matrix is K. Next, consider a random walk on that graph, and its stationary or ergodic distribution. The popularity of a given node of graph G is determined by the amount of time a random walker would spend on the node. The popularity of a given node also depends on the number, popularity and closeness of its neighbor nodes. This information is provided by the first eigenvector of K. The distance between the first two eigenvalues provides information about the degree of connectivity of the graph, which can be used to measure the amount of structure in the data. Similarly, the entropy of the stationary distribution can quantify connectivity. Alternatively, lifting can be used to explicitly adapt the first eigenvector and, therefore, the kernels. "Lifting" is described by H. Chang, et al. in "Creating Customized Authority Lists", 17th International Conference on Machine Learning, Jun. 29–Jul. 2, 2000, which is incorporated herein by reference. Briefly, lifting involves using gradient ascent on the elements of a matrix to alter the weights of elements to more closely align the first eigenvector with a certain element or group of elements which is considered to be more important. The element or combination of elements to which the first eigenvector is aligned is referred to as a "handle" that can be used to "lift" the desired data points away from the rest of the elements in the matrix.

Any of the preceding procedures can be used as a preprocessing step to clean or expand data. Further, preprocessing may include expanding the data by treating the label as another feature. Using such techniques, identifying isolated points, e.g., outliers, would amount to flagging unusual combinations of x and y.

Alignment can be used to measure the level of fitness between a kernel and a fixed labeling of the data, with the goal of selecting better kernel parameters, i.e., the best aligned set of labels. The absolute measure of a kernel is its second eigenvalue, which can be used to optimize kernel parameters. Using eigentechniques, the measure of the kernel can be lower-bounded with the second eigenvalue.

Consider the constraint C1: $\Sigma_+ p_i = \Sigma_- p_i$. The requirement that y = −1 or +1 is relaxed and the following conditions are applied: $\Sigma y_i^2 = m$ and $\Sigma_+ p_i = \Sigma_- p_i$, so that the two classes have equal probability under the distribution of the first eigenvector.

Under these constraints, the alignment can be maximized by spectral techniques. Defining $$v = \frac{y}{\sqrt{(m)}},$$

the problem becomes:

$$\min_{C1, \sum y_i^2 = m} y'Ky = \min_{\sum v_2^2 = 1; +otherconstraint} \frac{v'Kv}{v'v} = \lambda_2,$$

where $v_2$ is the minimizer, the second eigenvector. Constraint C1 requires the probability of the two classes to be the same under the distribution given by the first eigenvector.

In other words, the second eigenvector maximizes the alignment under the constraint, and thresholding it provides a labeling that approximately maximizes alignment. The second eigenvalue gives the value of the alignment in this case, and is a lower bound under the true value of the optimal alignment. This provides an absolute measure of kernel alignment so that the maximal alignment can be achieved on all possible labeling. One can also tune the kernel parameters in a principled way, possibly by gradient descent, to achieve maximal alignment.

The empirical alignment of a kernel $k_1$ with a kernel $k_2$ with respect to the sample S is the quantity $$\hat{A}(S, k_1, k_2) = \frac{\langle K_1, K_2 \rangle_F}{\sqrt{\langle K_1, K_1 \rangle_F \langle K_2, K_2 \rangle_F}}, \quad (18)$$

where $K_i$ is the kernel matrix for the sample S using the kernel $k_i$;
the inner product between matrices $$\langle K_1, K_2 \rangle_F = \sum_{i,j=1}^{m} K_1(x_i, x_j) K_2(x_i, x_j);$$

and

F refers to the Frobenius norm that corresponds to this inner product.

The alignment can also be viewed as the cosine of the angle between to bi-dimensional vectors $K_1$ and $K_2$, representing the Gram matrices. If $k_2 = yy'$, where y is the vector of {−1, +1} labels for the sample, then:

$$\hat{A}(S, k, y) = \frac{\langle K, yy' \rangle_F}{\sqrt{\langle K, K \rangle_F \langle yy', yy' \rangle_F}} = \frac{\langle K, yy' \rangle_F}{m \|K\|_F}, \quad (19)$$

since $\langle yy', yy' \rangle_F = m^2$.

The relationship between alignment and cut cost is $$\hat{A}(S, k, y) = \frac{\sum_{ij} k(x_i, x_j) - 2C(S, k)}{m\sqrt{\langle K, K \rangle_F}} = T(S, k) - 2C(S, k, y), \quad (20)$$

where $T(S,k) = \hat{A}(S,k,j)$, for j the all ones vector. For normalized kernels $\|\phi(x_i) - \phi(x_j)\|^2 = 2 - 2K(x_i, x_j)$, and with a fixed K, choosing y to minimize $$\sum_{y_i \neq y_j} K_{ij}$$

is equivalent to maximizing $$\sum_{y_i = y_j} K_{ij},$$

which in turn is equivalent to minimizing the sum of the average square distances between all couples of points in the same class $$\sum_{y_i = y_j} \|\phi(x_i) - \phi(x_j)\|^2.$$

Furthermore, minimizing this quantity is equivalent to minimizing the sum of the average square distances of points from the class means since $$\sum_{y_i = C} \|\phi(x_i) - \mu(C)\|^2 = n_c - \frac{1}{n_c} \sum_{y_i = C = y_j} K_{ij}, \text{ where } \mu(C) = \frac{1}{n_C} \sum_i \phi(x_i). \quad (21)$$

This approach is directed to finding clusters that have minimal "scatter" around their mean. Among other appealing properties of the alignment is that this quantity is sharply concentrated around its mean, thus showing that the expected alignment can be reliably estimated from its empirical estimate $\hat{A}(S)$. Since the cut cost can be expressed as the difference of two alignments $$C(S,k,y) = 0.5(T(S,k) - \hat{A}(S,K,y)), \quad (22)$$

cut cost will be similarly concentrated around its expected value.

To optimize the alignment, the problem is to find the best-aligned set of labels $$\hat{A}*(S, k) = \max_{y \in \{-1,+1\}^m} \hat{A}(S, k, y) = \max_{y \in \{-1,+1\}^m} \frac{\langle K, yy' \rangle_F}{m\sqrt{\langle K, K \rangle_F}}. \quad (23)$$

Since in this setting the kernel is fixed, maximizing the alignment reduces to choosing $y \in \{-1, +1\}^m$ to maximize $\langle K, yy' \rangle = y'Ky$. If y is selected from the larger set $R^m$ subject to the constraint $\|y\|^2 = m$, an approximate maximum alignment problem can be solved efficiently. After solving the relaxed problem, an approximate discrete solution can be obtained by choosing a suitable threshold to the entries in the vector y and applying a sign function. Bounds will be given on the quality of approximations.

Solution of the approximate problem follows from the Courant-Fischer Minimax Theorem (Equation 6, above), which provides a variational characterization of the spectrum of symmetric matrices.

Looking at the first eigenvector, the first minimum does not apply, and the approximate alignment problem is solved by the first eigenvector, so that the maximal alignment is upper bounded by a multiple of the first eigenvalue, $$\lambda_{\max} = \max_{0 \neq v \in R^m} \frac{v'Kv}{v'v}.$$

Vector v can now be transformed into a vector in $\{-1, +1\}^m$ by choosing the threshold $\theta$ that gives maximum alignment of $y=\text{sign}(v^{max}-\theta)$. By definition, the value of alignment $\hat{A}(S,k,y)$ obtained by this y will be a lower bound of the optimal alignment, such that $$\hat{A}(S, k, y) \leq \hat{A} *(S, k) \leq \frac{\lambda_{\max}}{\|K\|_F}. \quad (23)$$

The quality of the dichotomy can be estimated by comparing its value with the upper bound. The absolute alignment indicates how special a kernel is on a given dataset: the higher the quantity, the more committed to a specific dichotomy.

The first eigenvector can be calculated in a number of ways. One example is the Lanczos procedure, an algorithm for computing the eigenvalues and eigenvectors for large symmetric sparse matrices which has been shown to be effective for very large datasets. (Given any n×n sparse symmetric matrix A, Lanczos computes a k×k symmetric tridiagonal matrix T, whose eigenvalues are good approximations of the eigenvalues of T, and whose eigenvectors can be used to get approximate eigenvectors of A. Building T requires k matrix-vector multiplications with A; which is typically the most expensive part of the algorithm. Ideally, one would obtain a good enough approximation with k much smaller than n, which means one only approximates a small subset of k of A's n eigenvalues. Fortunately, the ones which converge first are the largest and the smallest, including $\lambda_2$.). To illustrate, Internet search engines such as Google® are based on estimating the first eigenvector of a matrix with dimensionality of more than $10^9$, so for very large datasets, there are effective approximation techniques.

Training methods using the present invention can be unsupervised, semi-supervised or supervised.

Training according to the present invention using unlabeled data, i.e., unsupervised training, provides means for clustering the data. The choice of kernel automatically defines two classes in the unlabeled dataset by means of the sign of the second eigenvector. Successive eigenvectors can be used for further partitionings. A measure of the goodness of a given cluster is the second eigenvalue, or its alignment. Kernel parameters can be tuned to optimize it. This can be done in similar manner with a Laplacian.

An algorithm for assessing the clustering power of a kernel follows the sequence:
1) build K (the kernel matrix)
2) build L (the Laplacian matrix)
3) compute eigL (first eigenvector of L)
4) find the number of clusters, i.e., the number of (approx.) zero eigenvalues.

For multiclass cases, the alignment is defined, however, $y_i y_j$ should be replaced with $y_i == y_j$ in the matrix to be compared against K. Again, this provides a measure of the clustering power of a kernel.

In the case of semi-supervised training, perhaps the most interesting application of the present invention is to provide an effective procedure for transduction, the learning framework in which the algorithm is required to label a known set of unlabeled points given a set of labeled points.

The labels that are known can be inserted into the kernel matrix as $y_i y_j$, i.e., the labels vector, while the other entries are set to $(K_{ij})$. If the kernel is bounded between MIN and MAX, then one should set to MIN the entries corresponding to different labels, and to MAX the ones corresponding to the same label.

The kernel will be required to output the maximally-aligned solution consistent with the known labels. This can be obtained by the second eigenvector. Analogously, it can be done using the Laplacian, obtaining a minimum cut cost solution. In this case, one obtains an algorithm that is somewhat similar to the Graph Mincuts algorithm for performing semi-labeled learning. (See, e.g., A. Blum and S. Chawla, "Learning from Labeled and Unlabeled Data Using Graph Mincuts", 18th International Conference on Machine Learning, Jun. 28–Jul. 1, 2001, which is incorporated herein by reference. Note, however, that this reference uses neither kernels nor spectral graph theory, nor does it mention transduction.)

In application of the present invention to supervised classification, the solution is completely determined once the kernel is selected. The training consists of optimizing the kernel parameters, thus reducing the training error of the adjacency eigenvector solution. The process is similar for the Laplacian. Concentration of the cost functions will provide good performance in the test phase. Given a test set, one can be confident that the eigenvector solution will identify a split similarly matching the one given by the labels.

Assessment of kernel quality using model selection can be used in conjunction with any other kernel-based learning method. One can use the absolute alignment as a measure of the fitness of a kernel and, hence, choose the kernel parameters to maximize it. Expressing the derivative of the second eigenvalue as a function of the tunable parameters would result in direct optimization of the kernel. Tuning of kernel parameters will provide more aligned solutions. A SVM would benefit from such an aligned kernel.

Novelty detection can be achieved using the first eigenvector of the adjacency matrix, which produces a ranking of the data items based on their "typicity" or popularity. The points that are more clustered in feature space will receive a higher ranking, while isolated points receive a very low ranking. Such a procedure can serve as a data cleaning technique, anomaly detection or other identification of "dirty data", and, thus, may be used in a pre-processing step prior to SVM (or other kernel machine) analysis to clean the data by removing or correcting the dirty data. The entropy of this eigenvector, or the relation between the two first eigenvalues, can give a measure of how connected the graph is, or how organized the data are in feature space. The same method can be used for data cleaning by considering the labels as another feature and by spotting rare combinations of x and y.

The present invention combines results from spectral graph theory with the concept of the kernel function to obtain a new class of learning algorithms for supervised, semi-supervised, and unsupervised learning. Methods can be developed for automatically tuning parameters by working out the gradient of eigenvalues or alignment with respect to the parameters, or by technique akin to lifting, which is discussed above. Also, kernel adaptation can be performed to rotate a second eigenvector to align with a given set of labels. Higher order eigenvectors can be exploited for further refining partitions and for obtaining greater robustness against noise.

To demonstrate the performance of the present invention, two binary classification datasets were used; The Wisconsin breast cancer dataset, obtained from the University of Wisconsin hospitals, which contains nine integer values inputs, a single binary output (benign or malignant) and 699 datapoints; and the ionosphere dataset available from the UCI (University of California, Irvine) Machine Learning Repository, which contains 34 inputs, a single binary output and 351 datapoints. The data was pre-processed by first normalizing the input vectors in the kernel-defined feature space, then centering them by shifting the origin (of the feature space) to their center of gravity. Pre-processing was performed by the following transformation of the kernel matrix:

$$K \leftarrow K - m^{-1}jg' - m^{-1}gj' + m^{-2}j'KjJ \quad (24)$$

where j is the all one vector, J the all ones matrix, and g the vector of row sums of K.

EXAMPLE 1

Figure 1B:
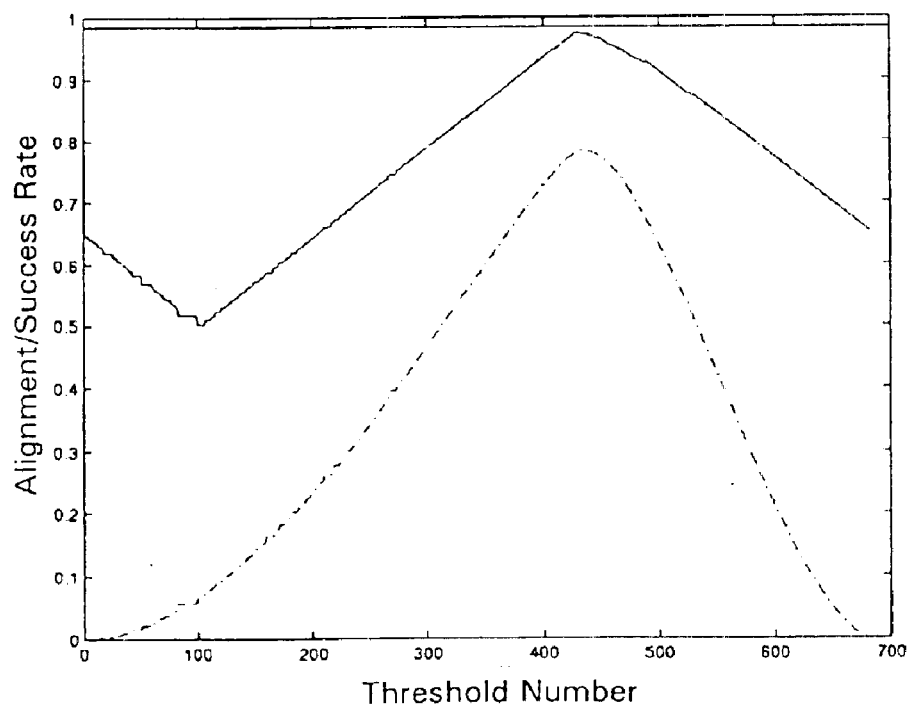
FIG. 1(b) is a plot of the upper bound, alignment and accuracy of the solution following unsupervised learning in a linear kernel on the UW breast cancer dataset in which the alignment of the kernel to a label vector is optimized.

Using the breast cancer dataset, the unsupervised technique was applied with a linear kernel, with alignment being optimized. FIG. 1(a) is a plot of the alignment of the different eigenvectors with the labels in order of increasing eigenvalue. The highest alignment is shown by the last eigenvector corresponding to the largest eigenvalue. For each value $\theta_i$ of the threshold, FIG. 1(b) shows the upper bound of $\lambda_{max}/\|K\|_F$ (the straight line at the top), the alignment $\hat{A}(S,k,y)$ for $y=\text{sign}(v^{max}-\theta_i)$ (the bottom curve), and the accuracy of y (the middle curve). Where actual alignment and upper bound on alignment are the closest, there is confidence that the data has been partitioned well, and that accuracy is maximized. The choice of the threshold corresponds to maintaining the correct proportion between positives and negatives. Another possible threshold strategy is based on the availability of enough labeled points to provide a good estimate of the proportion of positive points in the dataset. In this way, label information can be used to select the threshold.

EXAMPLE 2

Figure 2:
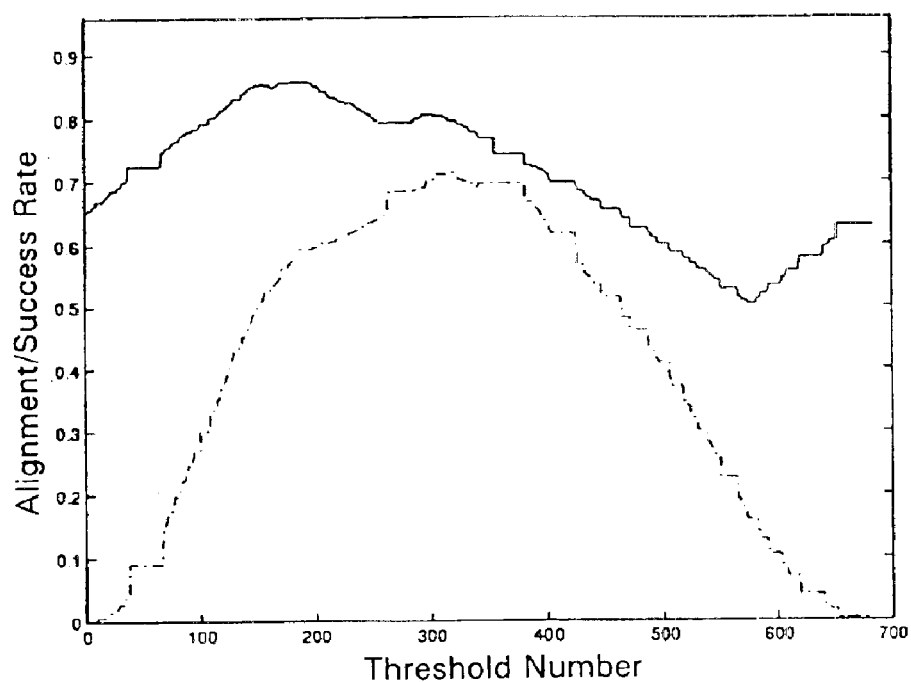
FIG. 2 is a plot of the upper bound, alignment and accuracy of the solution following unsupervised learning in a Gaussian kernel on the UW breast cancer dataset in which the alignment of the kernel to a label vector is optimized.

Using the same breast cancer dataset as in Example 1, a Gaussian kernel ($\sigma=6$) was used. As above, alignment was optimized. In this case, the accuracy obtained by optimizing the alignment was less impressive. For the breast cancer dataset (threshold number 316), the accuracy was about 79.65%, as shown in FIG. 2, where the straight line at the top shows the upper bound of $\lambda_{max}/\|K\|_F$, alignment $\hat{A}(S,k,y)$ for $y=\text{sign}(v^{max}-\theta_i)$ is shown in the bottom (dashed) curve, and the accuracy of y is plotted in the middle curve.

EXAMPLE 3

Figure 3:
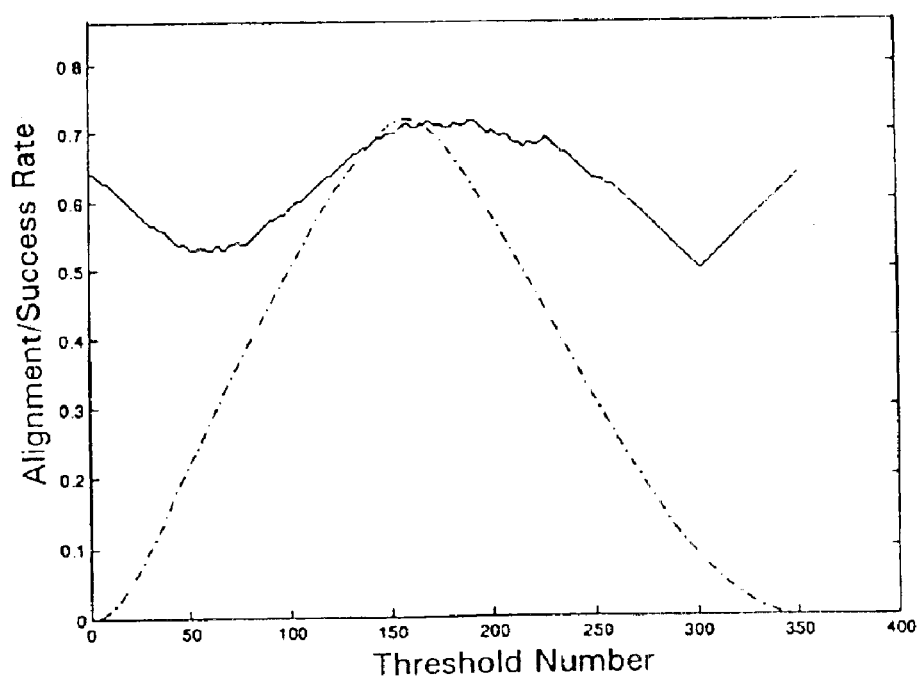
FIG. 3 is a plot of the upper bound, alignment and accuracy of the solution following unsupervised learning in a linear kernel on the UCI ionosphere dataset in which the alignment of the kernel to a label vector is optimized.

For the ionosphere dataset using a linear kernel and optimized alignment, the accuracy split that optimizes the alignment (threshold number 158) is approximately 71.37%. For each value $\theta_i$ of the threshold, FIG. 3 shows the upper bound of $\lambda_{max}/\|K\|_F$ (the straight line at the top), the alignment $\hat{A}(S,k,y)$ for $y=\text{sign}(v^{max}-\theta_i)$ (the bottom (dashed) curve), and the accuracy of y (the middle curve).

An overall approach can be used to adapt the kernel to the data. For example, the kernel parameters can be chosen so as to optimize $\lambda_{max}/\|K\|_F$. Then, find the first eigenvector, choose a threshold to maximize the alignment, and output the corresponding y. The cost to the alignment of changing a label $$y_i \text{ is } \frac{2\sum_j y_j k(x_i, x_j)}{\|K\|_F},$$

so that if a point is isolated from the others, or if it is equally close to the two different classes, then changing its label will have only a small effect. On the other hand, labels in strongly clustered points clearly contribute to the overall cost such that changing their label will alter the alignment significantly.

The method described herein can be viewed as projecting the data into a 1-dimensional space and finding a threshold. The projection also implicitly sorts the data so that points from the same class are nearby in the ordering. The problem is addressed in the 2-class class. The set is embedded into the real line so as to satisfy a clustering criterion. The resulting kernel matrix should appear as a block diagonal matrix.

Let the coordinate of the point $x_i$ on the real line be v(i). The cost function $$\sum_{ij} v(i)v(j)K(i,j)$$

is maximized when points with high similarity have the same sign and high absolute value, and when points with different sign have low similarity. The choice of coordinates v that optimizes the cost function is the first eigenvector. Thus, by sorting the data according to the value of their entry in this eigenvector, a good permutation should be found which renders the kernel matrix block diagonal.

EXAMPLE 4

Figure 4A:
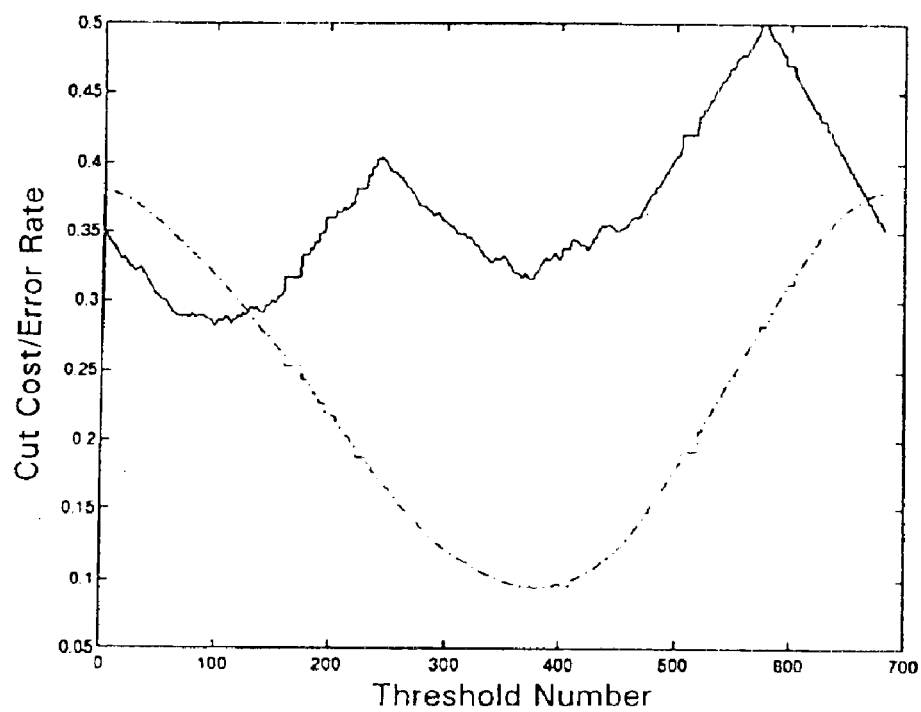
FIG. 4(a) is a plot of cut cost and error rate versus threshold number following unsupervised learning in a linear kernel trained on the UW breast cancer dataset.
Figure 4B:
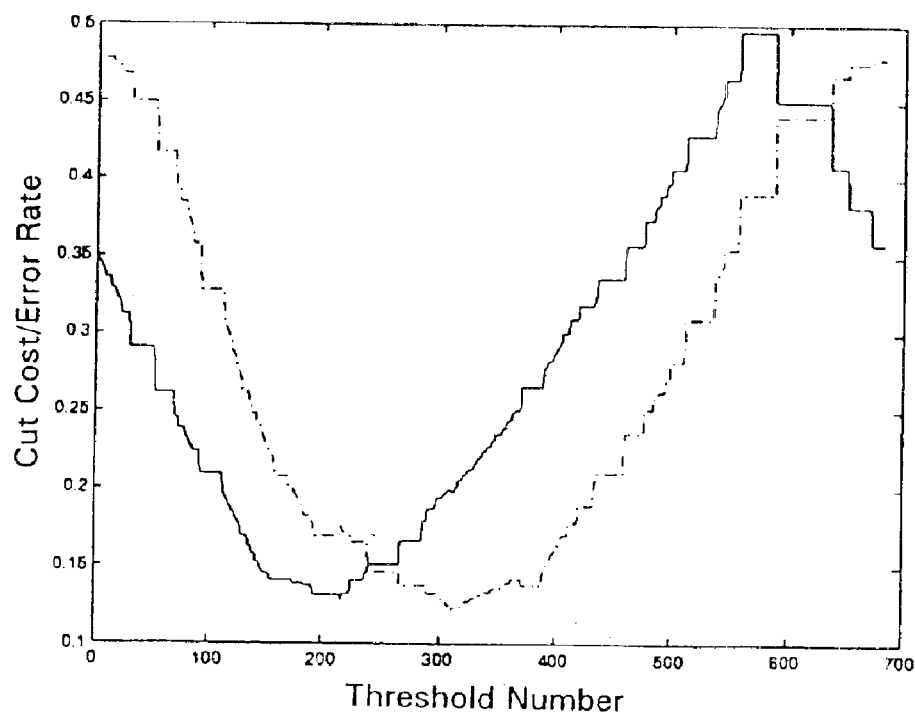
FIG. 4(b) is a plot of cut cost and error rate versus threshold number following unsupervised learning in a Gaussian kernel trained on the UW breast cancer dataset.

Using the breast cancer dataset with both linear and Gaussian kernel, cut cost (see Equation 5) was used to select the best threshold. The results are plotted in FIGS. 4(a) and (b), where cut cost $C(S,k,y) - \lambda/(2\|K\|_F$ for $y=\text{sign}(v^{max}-\theta_i)$ is indicated by the dashed curve and error rate of y against threshold i is indicated by the solid curve. For the linear kernel, FIG. 4(a), the threshold was set at 378 with an accuracy of 67.86%, which is significantly worse than the results obtained by optimizing the alignment. With the Gaussian kernel, FIG. 4(b), the method selects threshold 312 with an accuracy of 80.31%, a slight improvement over the results obtained with the Gaussian kernel by optimizing the alignment.

Thus far, the examples use unsupervised data. Transduction, or semi-supervised learning, can be performed if the dataset is partially labeled. The idea that some labeled data could improve performance comes from observing FIG. 4(b), where the selection based on the cut cost is suboptimal. By incorporating some label information, improved threshold selection can be achieved.

Let z be the vector containing known labels and 0 elsewhere. Set $KP=K+C_0zz'$, where $C_0$ is a positive constant parameter. The original matrix K is used to generate the eigenvector, while the matrix KP is used when measuring the cut cost of the classifications generated by different thresholds. Taking $C_0$=1,5 random selections of 20% of the data were performed, obtaining a mean success rate of 85.56% (standard deviation of 0.67%) for the breast cancer dataset with the Gaussian kernel, a marked improvement over the 80.31% obtained with no label information.

Figure 5:
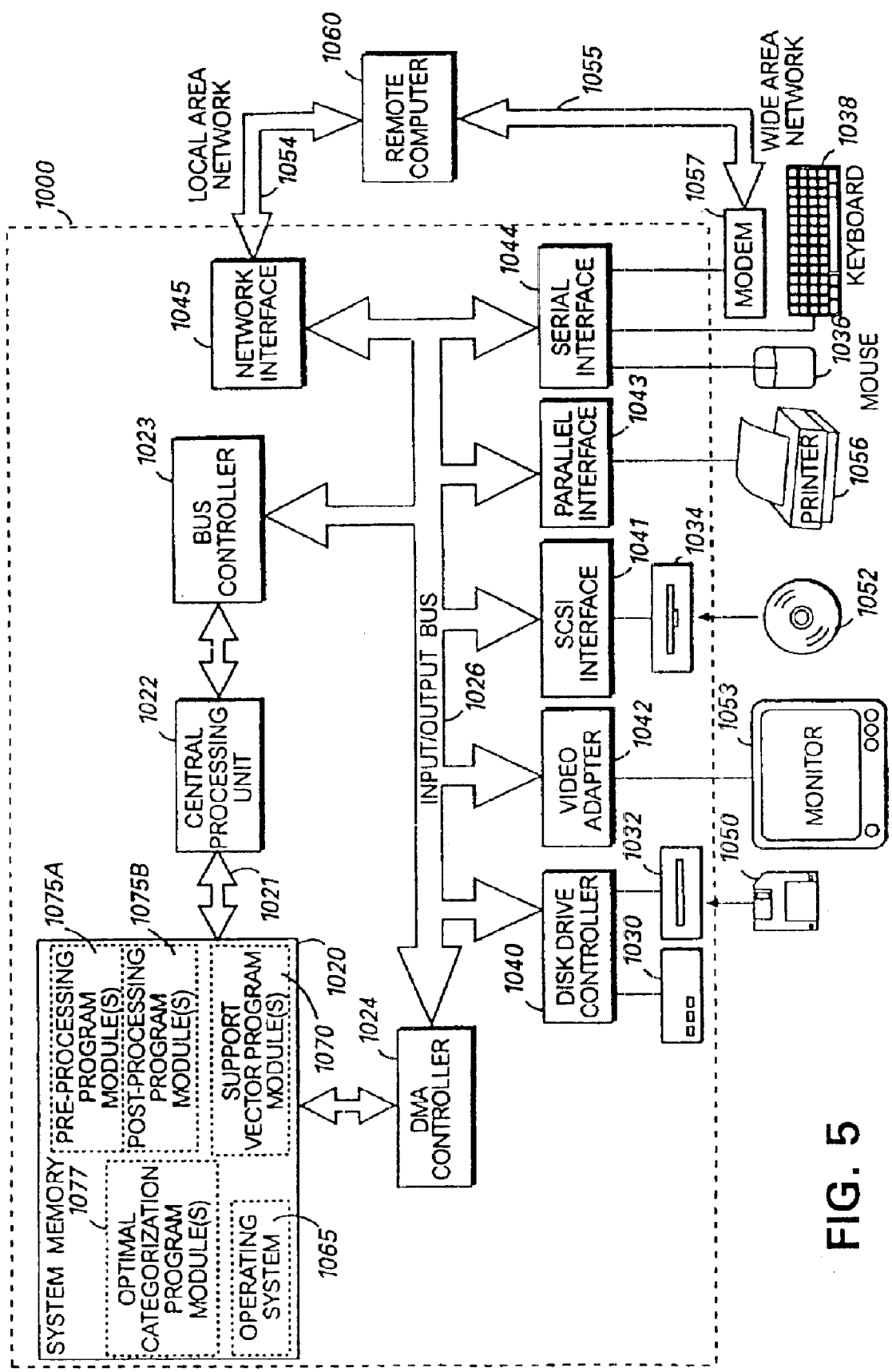
FIG. 5 is a functional block diagram illustrating an exemplary operating environment for an exemplary embodiment of the present invention.

The spectral kernel method of the present invention can be utilized for a wide range of kernel-based learning machines. In an exemplary embodiment, the spectral kernel is used in conjunction with one or more support vector machines. A suitable computing environment for implementing the exemplary support vector machine is illustrated in FIG. 5 and incorporates a conventional personal computer 1000. Nonetheless, those skilled in the art will recognize that the invention also may be implemented using other types of computer system configurations. The computer 1000 includes a central processing unit 1022, a system memory 1020, and an Input/Output ("I/O") bus 1026. A system bus 1021 couples the central processing unit 1022 to the system memory 1020. A bus controller 1023 controls the flow of data on the I/O bus 1026 and between the central processing unit 1022 and a variety of internal and external I/O devices. The I/O devices connected to the I/O bus 1026 may have direct access to the system memory 1020 using a Direct Memory Access ("DMA") controller 1024.

The I/O devices are connected to the I/O bus 1026 via a set of device interfaces. The device interfaces may include both hardware components and software components. For instance, a hard disk drive 1030 and a floppy disk drive 1032 for reading or writing removable media 1050 may be connected to the I/O bus 1026 through disk drive controllers 1040. An optical disk drive 1034 for reading or writing optical media 1052 may be connected to the I/O bus 1026 using a Small Computer System Interface ("SCSI") 1041. Alternatively, an IDE (Integrated Drive Electronics, i.e., a hard disk drive interface for PCs), ATAPI (ATtAchment Packet Interface, i.e., CD-ROM and tape drive interface), or EIDE (Enhanced IDE) interface may be associated with an optical drive such as may be the case with a CD-ROM drive. The drives and their associated computer-readable media provide nonvolatile storage for the computer 1000. In addition to the computer-readable media described above, other types of computer-readable media may also be used, such as ZIP drives, or the like.

A display device 1053, such as a monitor, is connected to the I/O bus 1026 via another interface, such as a video adapter 1042. A parallel interface 1043 connects synchronous peripheral devices, such as a laser printer 1056, to the I/O bus 1026. A serial interface 1044 connects communication devices to the I/O bus 1026. A user may enter commands and information into the computer 1000 via the serial interface 1044 or by using an input device, such as a keyboard 1038, a mouse 1036 or a modem 1057. Other peripheral devices (not shown) may also be connected to the computer 1000, such as audio input/output devices or image capture devices.

A number of program modules may be stored on the drives and in the system memory 1020. The system memory 1020 can include both Random Access Memory ("RAM") and Read Only Memory ("ROM"). The program modules control how the computer 1000 functions and interacts with the user, with I/O devices or with other computers. Program modules include routines, operating systems 1065, application programs, data structures, and other software or firmware components. In an illustrative embodiment, the learning machine may comprise one or more pre-processing program modules 1075A, one or more post-processing program modules 1075B, and/or one or more optimal categorization program modules 1077 and one or more SVM program modules 1070 stored on the drives or in the system memory 1020 of the computer 1000. A plurality of SVMs can be configured to hierarchically process multiple data sets in parallel or sequentially. Specifically, pre-processing program modules 1075A, post-processing program modules 1075B, together with the SVM program modules 1070 may comprise computer-executable instructions for pre-processing data and post-processing output from a learning machine and implementing the learning algorithm.

The computer 1000 may operate in a networked environment using logical connections to one or more remote computers, such as remote computer 1060. The remote computer 1060 may be a server, a router, a peer device or other common network node, and typically includes many or all of the elements described in connection with the computer 1000. In a networked environment, program modules and data may be stored on the remote computer 1060. The logical connections depicted in FIG. 8 include a local area network ("LAN") 1054 and a wide area network ("WAN") 1055. In a LAN environment, a network interface 1045, such as an Ethernet adapter card, can be used to connect the computer 1000 to the remote computer 1060. In a WAN environment, the computer 1000 may use a telecommunications device, such as a modem 1057, to establish a connection. It will be appreciated that the network connections shown are illustrative and other devices of establishing a communications link between the computers may be used.

Alternative embodiments of the present invention will become apparent to those having ordinary skill in the art to which the present invention pertains. Such alternate embodiments are considered to be encompassed within the spirit and scope of the present invention. Accordingly, the scope of the present invention is to be limited solely by the appended claims, which are supported by the foregoing exemplary embodiments of the invention.

What is claimed:

1. A method for training a kernel-based learning machine using a dataset comprising:

filling a kernel matrix with a plurality of kernels, each kernel comprising a pairwise similarity between a pair of data points within a plurality of data points in the dataset;

defining a fully-connected graph comprising a plurality of nodes and a plurality of edges connecting at least a portion of the plurality of nodes with other nodes of the plurality, each edge of the plurality of edges having a weight equal to the kernel between a corresponding pair of data points, wherein the graph has an adjacency matrix that is equivalent to the kernel matrix;

computing a plurality of eigenvalues for the kernel matrix;

selecting a first eigenvector corresponding to the smallest non-zero eigenvalue of the plurality of eigenvalues;

bisecting the dataset into two classes using the first eigenvector;

aligning the kernels using a second eigenvector so that the two classes have equal probability; and selecting an optimized kernel for use in the learning machine, wherein the optimized kernel produces maximal kernel alignment.

2. The method of claim 1, further comprising, after computing the plurality of eigenvalues, determining a number of clusters of data points within the dataset by identifying all zero eigenvalues.

3. The method of claim 1, further comprising:
minimizing a cut cost for bisecting the dataset by applying a threshold to the second eigenvector.

4. The method of claim 3, wherein the threshold limits the second eigenvector to entries of −1 and +1.

5. The method of claim 1, wherein the data points within the dataset are unlabeled and the step of bisecting the dataset comprises dividing up the data points among a plurality of clusters.

6. The method of claim 1, wherein the data points within a first portion of the dataset are labeled and the data points of a second portion of the dataset are unlabeled, and wherein the step of filling the kernel matrix comprises:
selecting a kernel K;
normalizing the selected kernel K to $-1 \leq K \leq +1$; and
if both data points of a pair come from the first portion of the dataset, the corresponding kernel comprises a labels vector.

7. The method of claim 6, further comprising: thresholding the second eigenvector; and based on the alignment, assigning labels to the unlabeled data points.

8. The method of claim 7, further comprising adjusting at least a portion of the plurality of kernels to align the second eigenvector with a pre-determined label.

9. The method of claim 1, further comprising, prior to computing a plurality of eigenvalues, computing a first eigenvector and assigning a rank to each of the plurality of data points based on popularity.

10. The method of claim 9, further comprising identifying as dirty any data points of the plurality having a low rank.

11. The method of claim 10, further comprising cleaning the dirty data points.

12. A spectral kernel machine comprising:
at least one kernel selected from a plurality of kernels for mapping data into a feature space, the at least one kernel selected by training the plurality of kernels on a dataset comprising a plurality of data points wherein the dataset is divided into a plurality of clusters by applying spectral graph theory to the dataset and selecting the at least one kernel that is optimally aligned with the division between the plurality of clusters, wherein optimal alignment is achieved by requiring that the probability of the plurality of clusters be the same.

13. The spectral kernel machine of claim 12, wherein the division between the plurality of clusters is determined by a first eigenvector in an adjacency matrix corresponding to a graph comprising a plurality of nodes comprising the plurality of data points.

14. The spectral kernel machine of claim 12, wherein the dataset is unlabeled.

15. The spectral kernel machine of claim 12, wherein the dataset is partially labeled.

16. A spectral kernel machine comprising:
at least one kernel selected from a plurality of kernels for mapping data into a feature space, the at least one kernel selected by applying the plurality of kernels to a dataset comprising a plurality of data points wherein the dataset is bisected into a plurality of clusters by applying spectral graph theory to the dataset and selecting the at least one kernel that minimizes a cut cost in partitioning of the data points between the plurality of clusters, wherein the probability of the plurality of clusters is the same.

17. The spectral kernel machine of claim 16, wherein the partitioning of the data points between the plurality of clusters is determined by a first eigenvector in an adjacency matrix corresponding to a graph comprising a plurality of nodes comprising the plurality of data points and wherein a second eigenvector determines maximal alignment by imposing a constraint that the probability of the plurality of clusters be the same.

* * * * *